US008124280B2

(12) United States Patent
Thackeray et al.

(10) Patent No.: US 8,124,280 B2
(45) Date of Patent: Feb. 28, 2012

(54) INTERMETALLIC ELECTRODES FOR LITHIUM BATTERIES

(75) Inventors: Michael M Thackeray, Naperville, IL (US); John T. Vaughey, Elmhurst, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 1104 days.

(21) Appl. No.: 12/002,968

(22) Filed: Dec. 19, 2007

(65) Prior Publication Data

US 2008/0152996 A1    Jun. 26, 2008

Related U.S. Application Data

(60) Provisional application No. 60/876,635, filed on Dec. 22, 2006.

(51) Int. Cl.
   *H01M 4/13*       (2010.01)
   *H01M 4/58*       (2010.01)
(52) U.S. Cl. .................................. 429/218.1; 423/263
(58) Field of Classification Search ............... 429/218.1; 423/263
   See application file for complete search history.

(56) References Cited

U.S. PATENT DOCUMENTS

| 5,770,333 | A  | 6/1998 | Saito et al. |
| 6,203,944 | B1 | 3/2001 | Turner et al. |
| 6,528,208 | B1 | 3/2003 | Thackeray et al. |
| 6,699,336 | B2 | 3/2004 | Turner et al. |
| 6,730,429 | B2 | 5/2004 | Thackeray et al. |
| 6,855,460 | B2 | 2/2005 | Vaughey et al. |
| 2002/0094475 | A1* | 7/2002 | Aoyama .................... 429/99 |
| 2002/0136953 | A1* | 9/2002 | Vaughey et al. ........... 429/218.1 |
| 2004/0248011 | A1* | 12/2004 | Asao et al. ............... 429/231.95 |

OTHER PUBLICATIONS

Sakaguchi et al., Anode Characteristics of Rare Earths—Tin Alloys for Rechargeable Lithium Batteries, May 2005, Rare Earths, vol. 46, 26-27.*
Official Translation of Sakaguchi et al. (above) used in Office Action (with the same publication data).*
M.M. Thackeray et al., Structural Considerations of Intermetallic Electrodes for Lithuim Batteries, J. Power Sources, 113, 124 (2003).
S. Matsuno et al., La3Ni2Sn7 Ternary Intermetallic Phase for Lithium Insertion and Deinsertion, Electrochemical and Solid State Letters, 8, A234 (2005).
K.D. Kepler et al., LixCu6Sn5 . . . :An Intermetallic Insertion Electrode for Rechargeable Lithium Batteries, Electrochemical and Solid State Letters, 2, 307 (1999).
M.M. Thackeray et al., Intermetallic Insertion Electrodes Derived From . . . Lithium Ion Batteries, Electrochem. Comm., 1, 111 (1999).

(Continued)

*Primary Examiner* — Gregg Cantelmo
*Assistant Examiner* — Eugenia Wang
(74) *Attorney, Agent, or Firm* — Olson & Cepuritis, Ltd.

(57) ABSTRACT

This invention relates to intermetallic negative electrode compounds for non-aqueous, electrochemical lithium cells and batteries. More specifically, the invention relates to one or more electrode components or compositions, one of which contains the basic structural unit of a $MM'_3$ intermetallic compound, in which M and M' are comprised of one or more metals. The $MM'_3$ intermetallic electrode compounds can be mixed, blended or integrated with one or more other intermetallic compounds, such as isostructural $M_3M'$ compounds. The electrodes are of particular use in rechargeable lithium-ion cells and batteries in numerous applications such as portable electronic devices, medical devices, space, aeronautical and defense-related devices and in transportation applications such as electric and hybrid-electric vehicles.

13 Claims, 14 Drawing Sheets

$MM'_3$ intermetallic compound in which the large and small spheres represent the M and M' atoms, respectively $M_3M'$ intermetallic compound in which the large and small spheres represent the M and M' atoms, respectively

OTHER PUBLICATIONS

J.T. Vaughey et al., NiAs- vs. Zinc-blende Type Intermetallic Insertion Electrodes for Lithium Batteries . . . , Electrochem. Soc. Inc. Proc. 99-24, 280 (2000).

D. Larcher et al., In-Situ X-ray Diffraction Study of the Electrochemical Reaction . . . J. Electrochem. Soc., 147, 1658 (2000).

L.M.L. Fransson et al., Structural Transformations in Lithiated . . . X-ray Diffraction, J. Electrochem Soc. 149, A736 (2002).

L.M.L. Fransson et al., Phase Transitions in Lithiated . . . X-ray Diffraction Study, Electrochem. Comm. 3, 317 (2001).

Vaughey, J.T., Substituted $M_xCu_{6-x}Sn_5$ Compounds . . . for Lithium Batteries, Electrochemical and Solid State Letters, 10 (9) A220-A224 (2007).

* cited by examiner

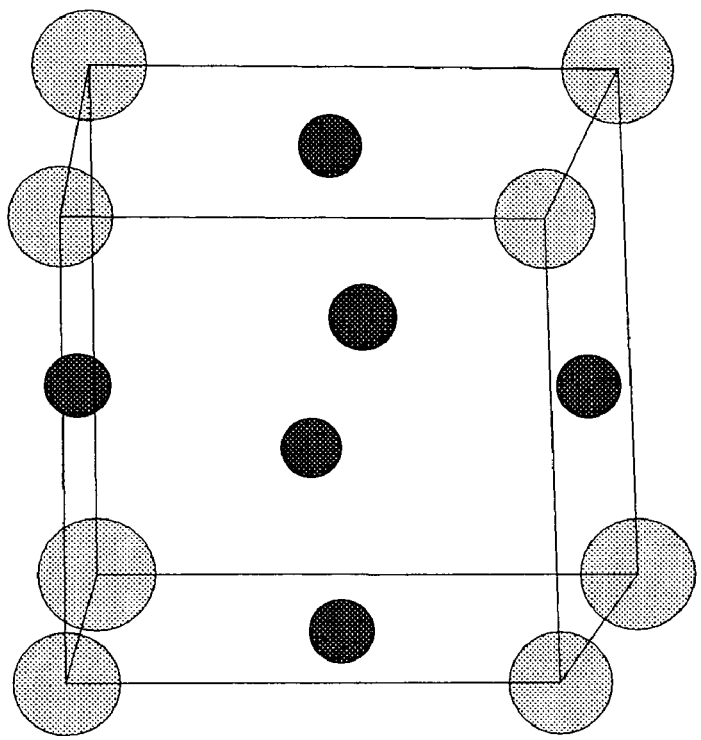
FIGURE 1a. MM'$_3$ intermetallic compound in which the large and small spheres represent the M and M' atoms, respectively

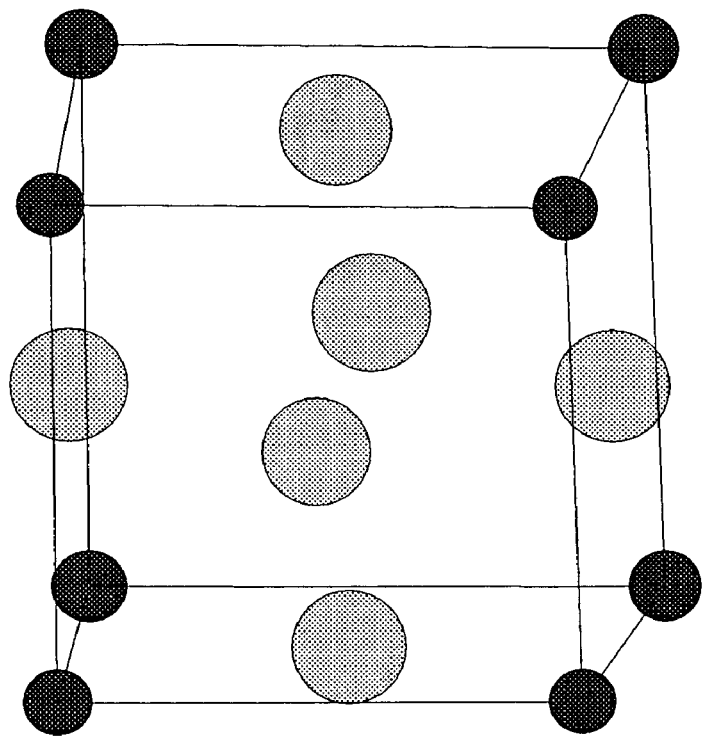
FIGURE 1b. $M_3M'$ intermetallic compound in which the large and small spheres represent the M and M' atoms, respectively

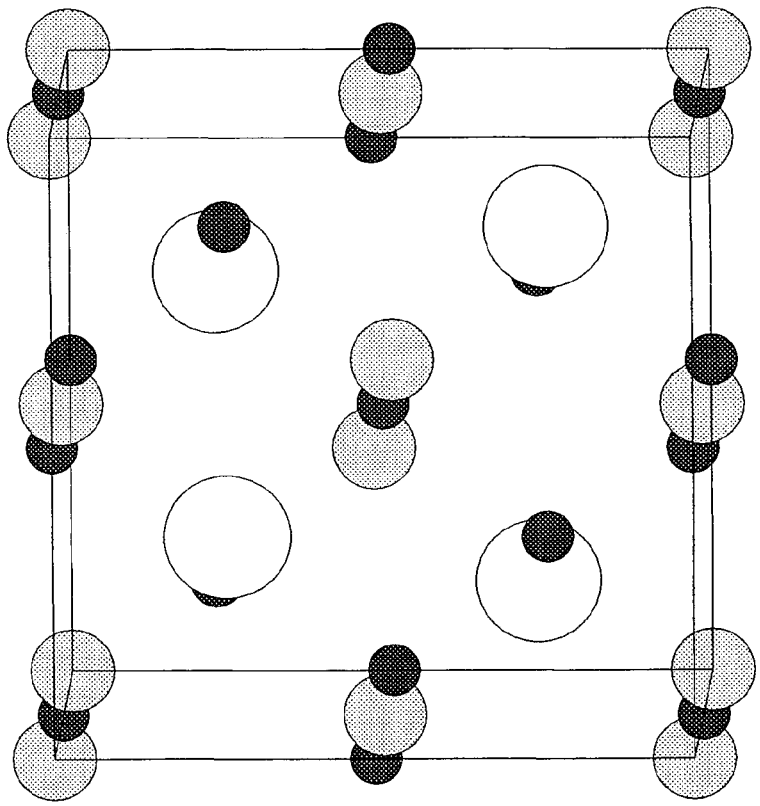
FIGURE 2a. Ordered $M_3M'$ intermetallic structure, as represented by the face-centered-cubic structure of $Li_2CuSn$.
● = Li;  ◐ = Cu;  ○ = Sn

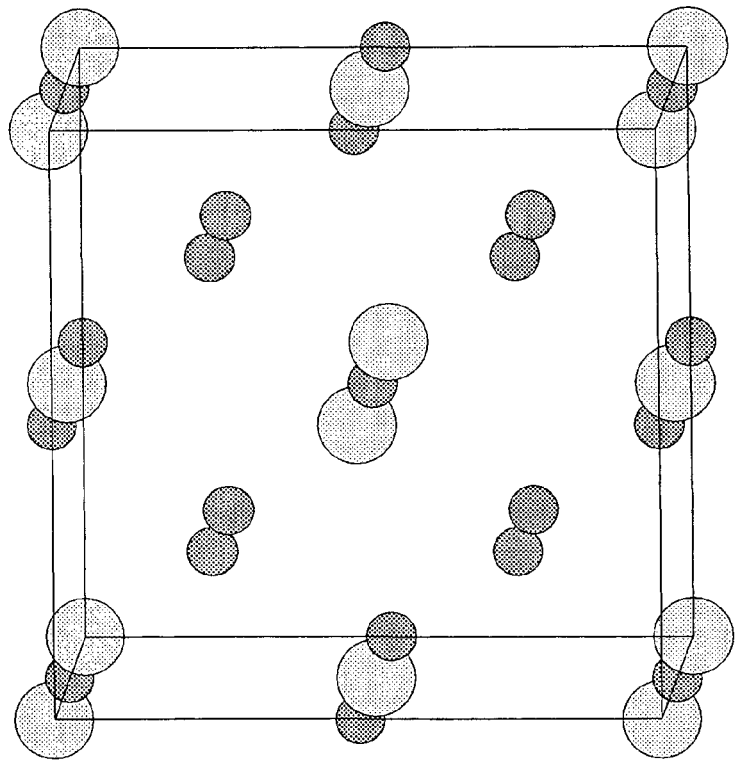
FIGURE 2b. Disordered $M_3M'$ intermetallic structure, as represented by the face-centered-cubic structure of $Li_2CuSn$.
● = Li and Cu;  ◯ = Sn

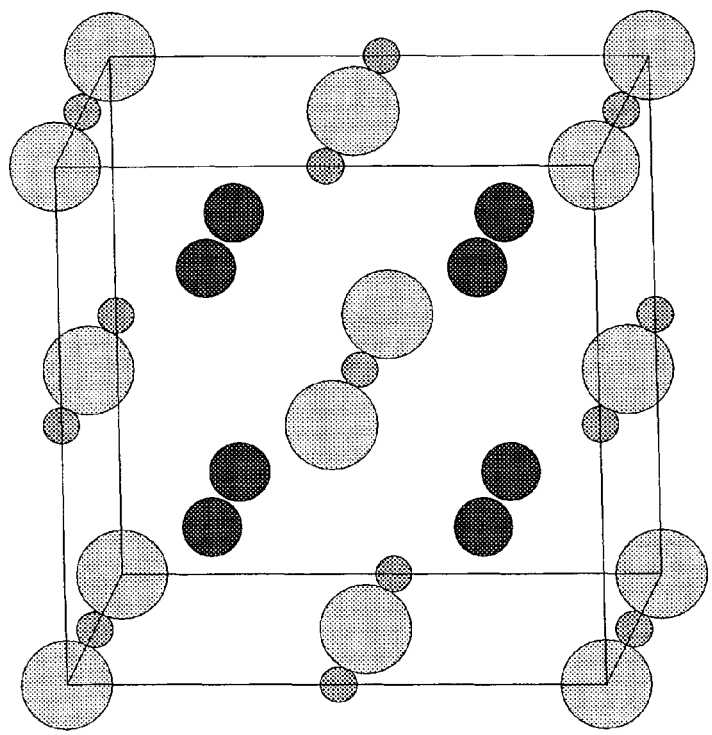
FIGURE 2c. Ordered $M_3M'$ intermetallic structure, as represented by the face-centered-cubic structure of $Cu_2MnAl$.
● = Cu;  ◉ = Mn;  ○ = Al

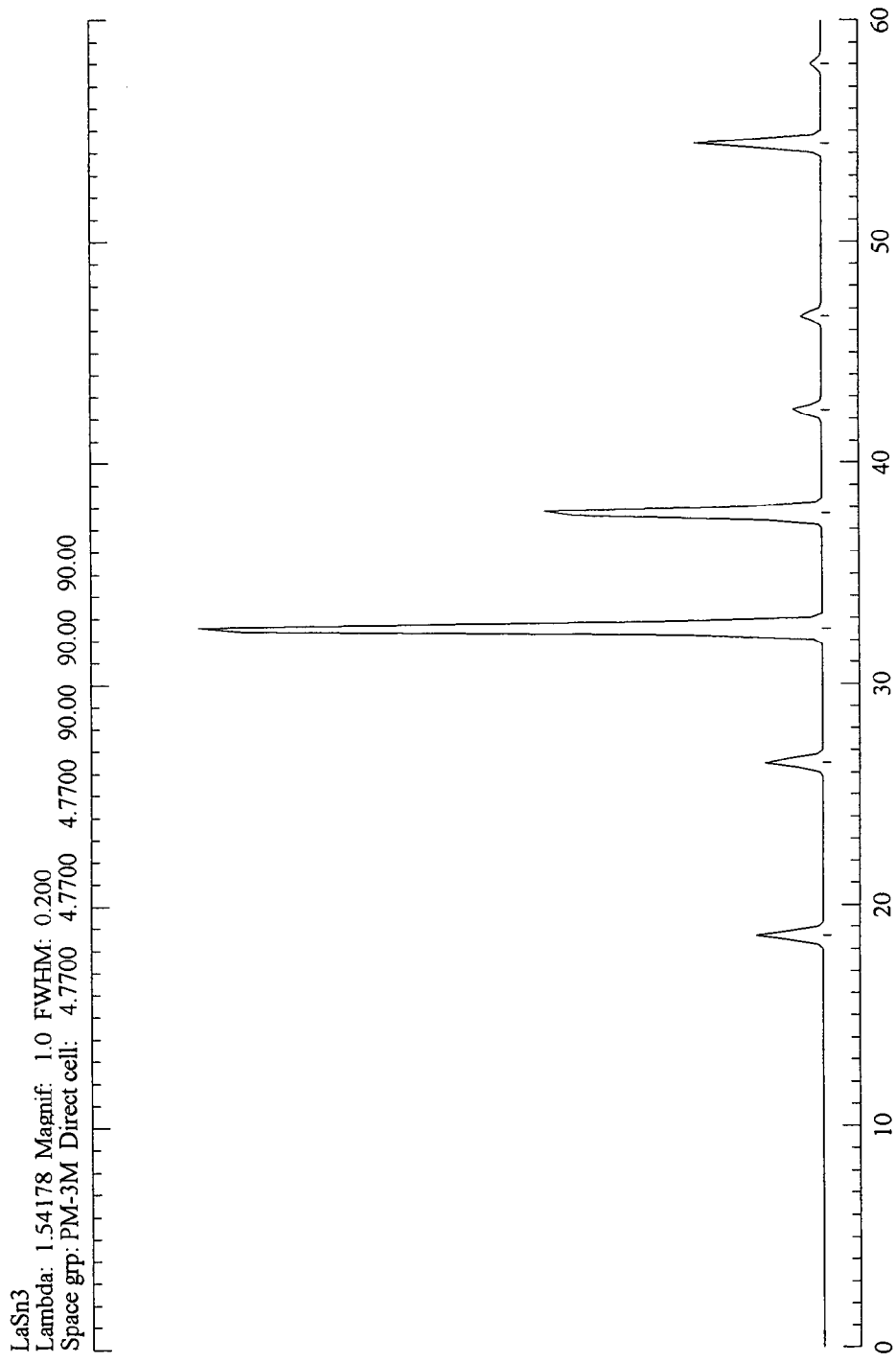
FIGURE 3a. Representative X-ray diffraction pattern of $LaSn_3$

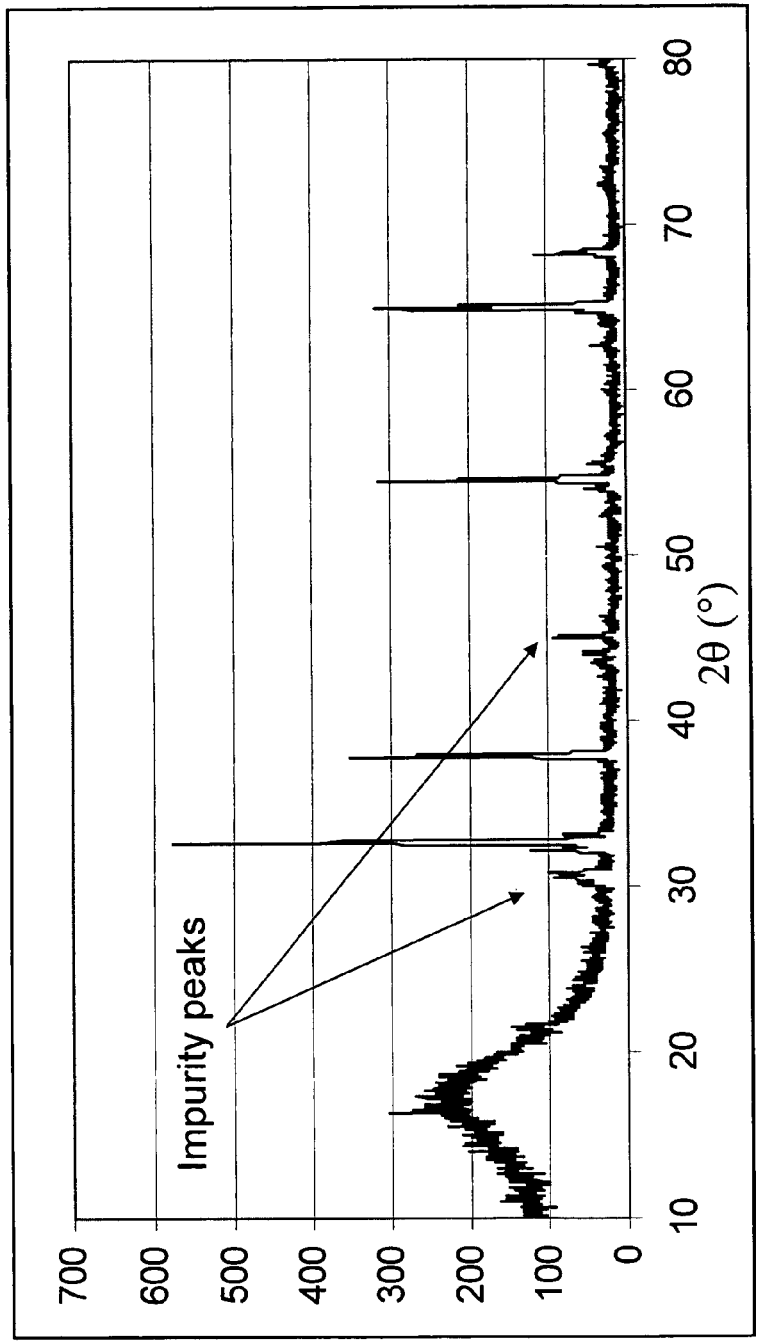
FIGURE 3b. X-ray diffraction pattern of experimentally-prepared $LaSn_3$

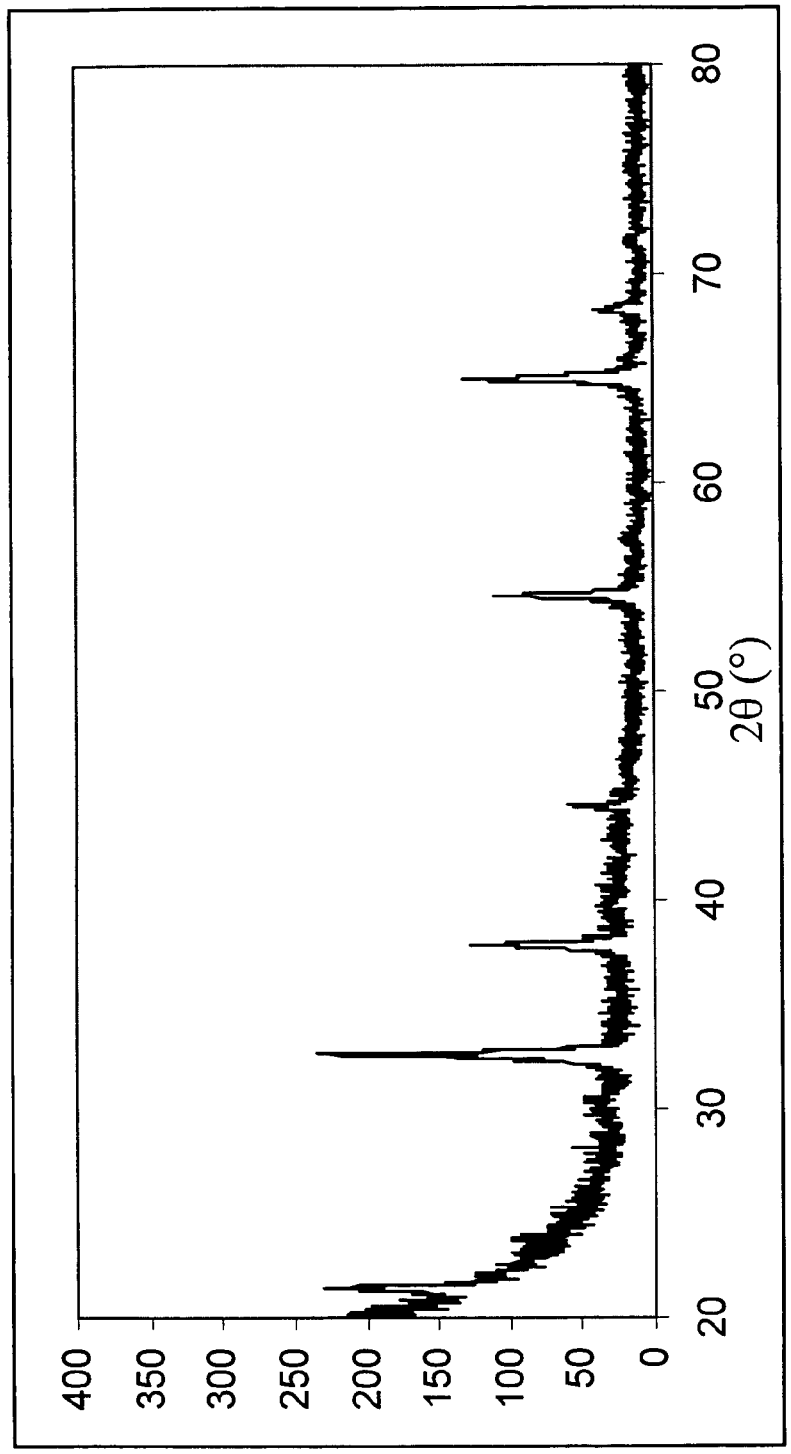
FIGURE 4. X-ray diffraction pattern of a substituted $LaSn_{3-x}In_x$ electrode sample (x=0.3)

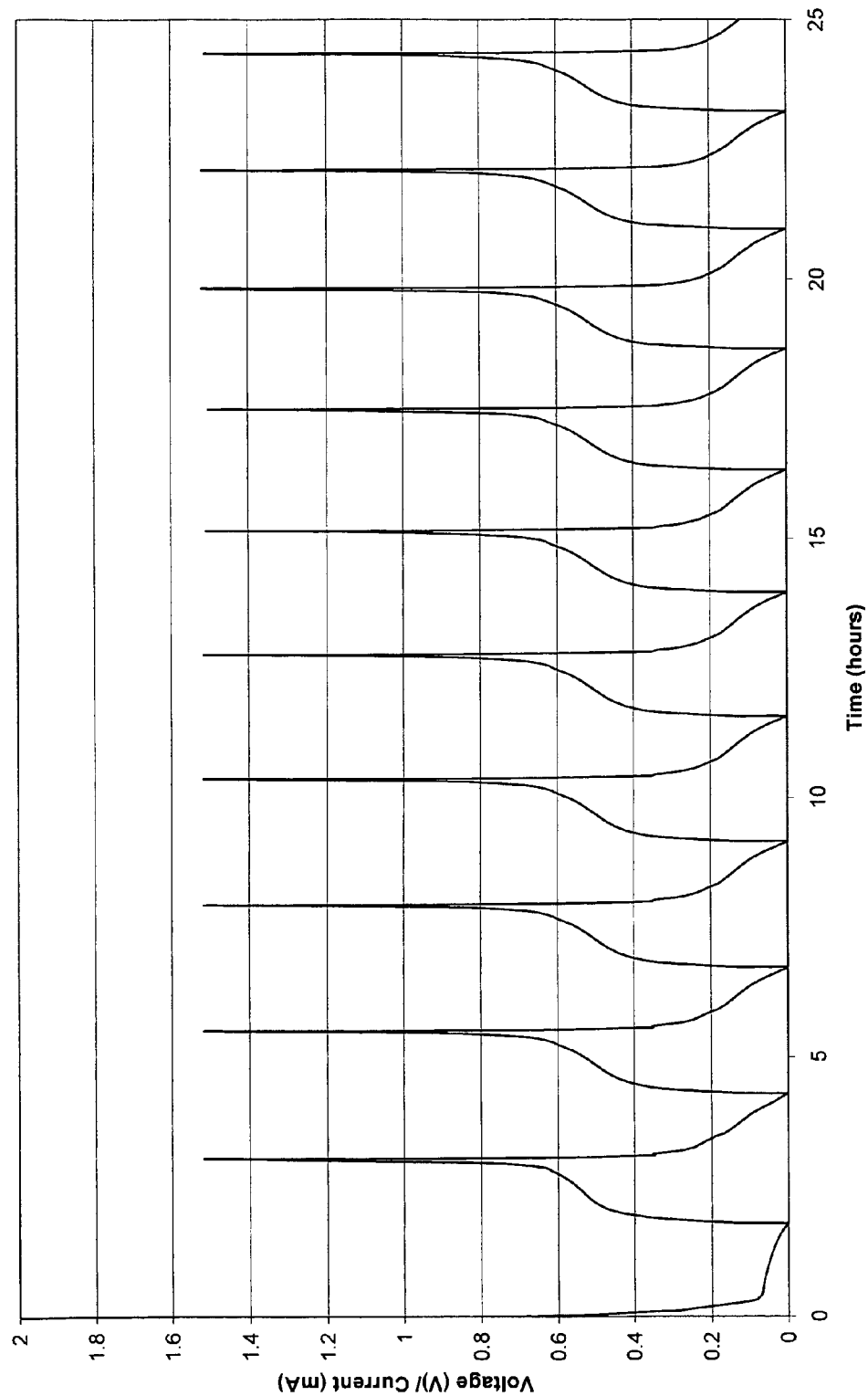
FIGURE 5. Electrochemical cycling plot of a Li/LaSn$_3$ cell

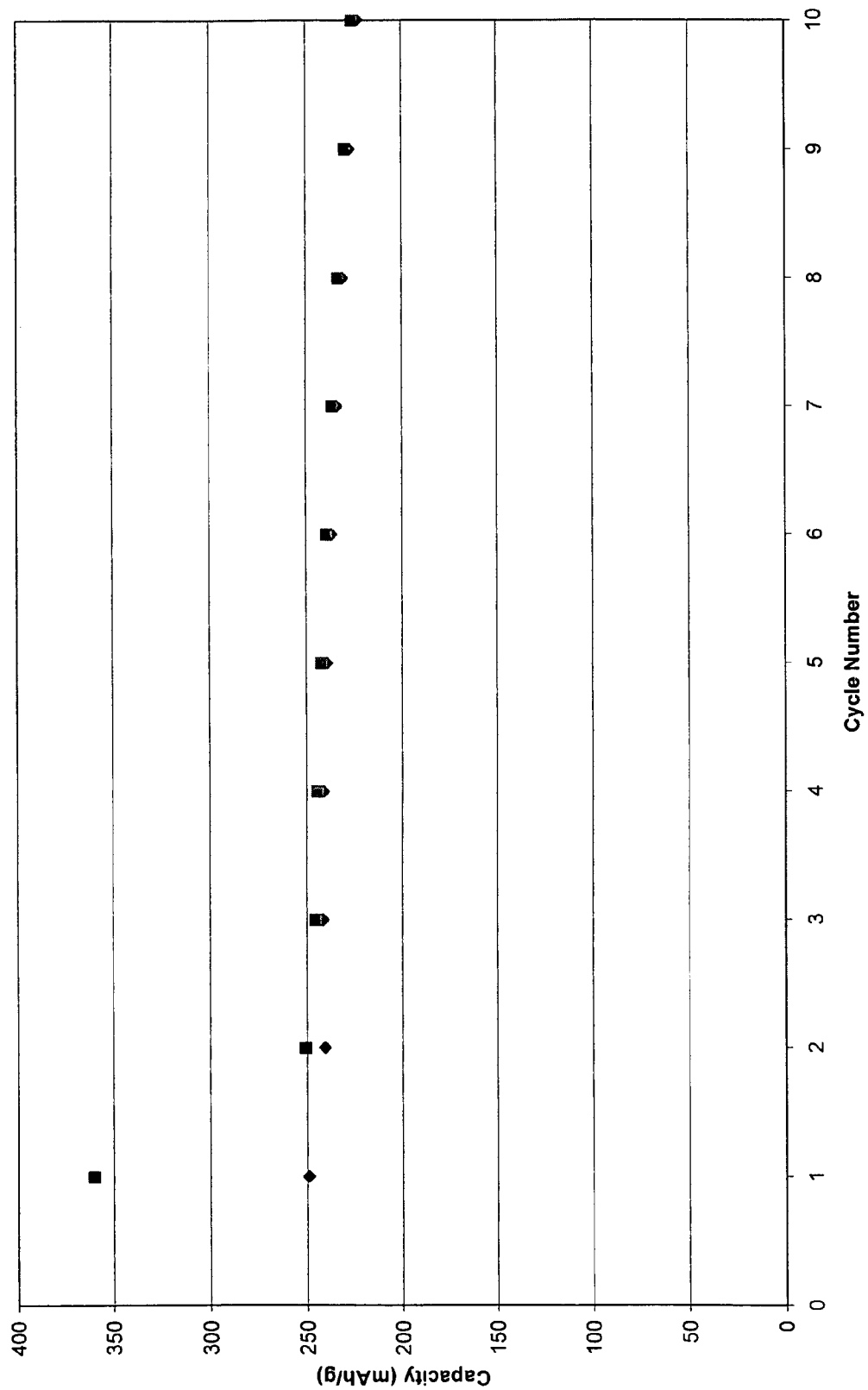
FIGURE 6. Capacity vs. cycle number plot of a Li/LaSn$_3$ cell

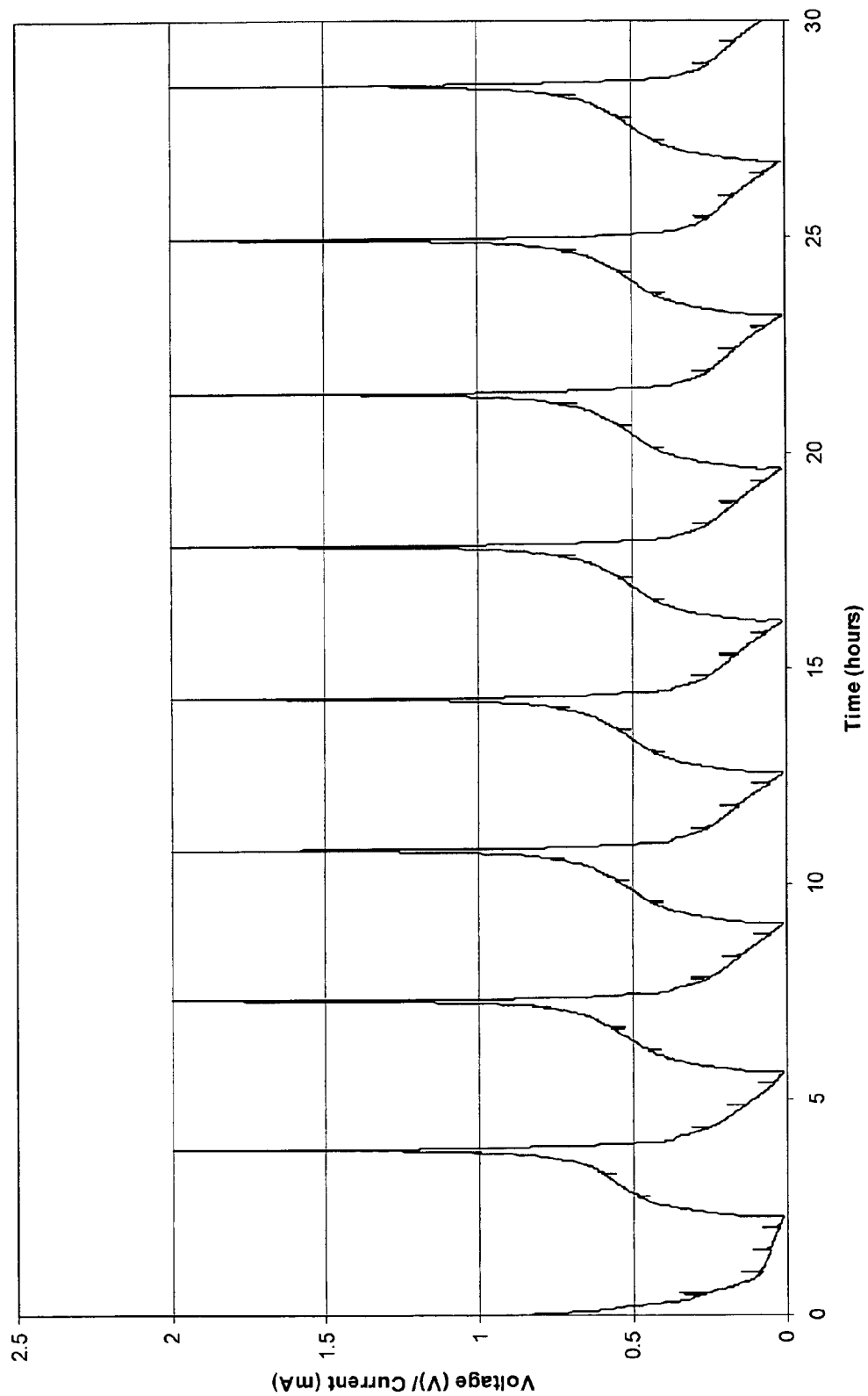
FIGURE 7. Electrochemical cycling plot of a Li/LaSn$_{3-x}$In$_x$ cell

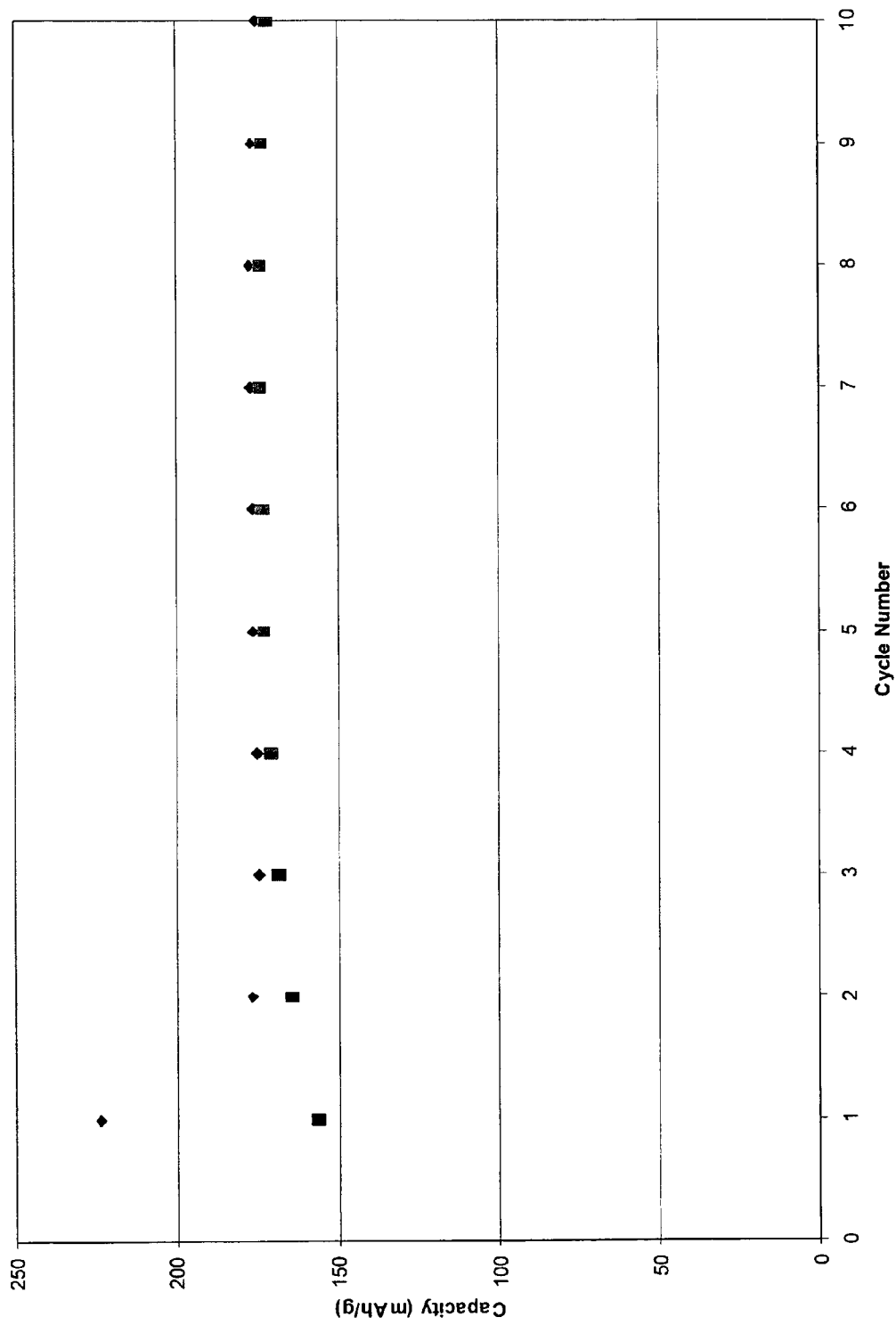
FIGURE 8. Capacity vs. cycle number plot of a Li/LaSn$_{3-x}$In$_x$ cell

US 8,124,280 B2

INTERMETALLIC ELECTRODES FOR LITHIUM BATTERIES

RELATED APPLICATIONS

This application, pursuant to 37 C.F.R. 1.78(c), claims priority based on provisional application Ser. No. 60/876,635 filed on Dec. 22, 2006.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention relates to intermetallic negative electrodes for non-aqueous, electrochemical lithium cells and batteries. The electrodes are of particular use in rechargeable lithium-ion batteries for energy storage in widespread applications such as portable electronic devices (for example, cell phones and laptop computers), medical-, space-, aeronautic- and defense-related devices and in transportation applications, such as electric and hybrid-electric vehicles.

SUMMARY OF THE INVENTION

This invention relates to intermetallic negative electrodes for non-aqueous, electrochemical lithium cells and batteries. More specifically, the invention relates to one or more electrode components or compositions, one of which contains the basic structural unit of a $MM'_3$ intermetallic compound with a $LaSn_3$-type structure in which the M and M' atoms are comprised of one or more metals, for example, as characterized by the families of Sn-based compounds, $LaSn_3$, $PrSn_3$, $NdSn_3$ and In-based compounds $LaIn_3$, $PrIn_3$, $NdIn_3$ in which the M' are atoms (Sn, In) that alloy with lithium. The structures of $LaSn_3$-type structures typically have a crystallographic primitive unit cell. The invention extends to include ternary, quaternary and higher order intermetallic electrodes in which the M and M' metal atoms can be of more than one atom type, some or all of which can form binary alloys when reacted with lithium. The $MM'_3$ intermetallic electrode compounds can be mixed, blended or integrated with one or more other intermetallic compounds with the same or different crystallographic structures, such as isostructural $M_3M'$ compounds, for example $La_3Sn$ or $La_3In$, or those defined by face-centered unit cells, to provide the electrode with enhanced electrochemical, structural, cycling and safety properties. The electrode structures of the present invention are either ordered, disordered or partially disordered. The electrodes are of particular use in rechargeable lithium-ion batteries for energy storage in widespread applications such as portable electronic devices (cell phones and laptop computers), medical devices, space, aeronautical and defense-related devices and in transportation applications such as electric and hybrid-electric vehicles.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIGS. 1(a) and (b) depict, respectively, a schematic representation of a) a $MM'_3$ intermetallic compound with a crystallographic primitive unit cell, and b) an isostructural $M_3M'$ intermetallic compound;

FIGS. 2(a) to 2(c) depict schematic representations of (a, c) two ordered configurations, and b) one disordered configuration of $M_3M'$ intermetallic structures with crystallographic face-centered unit cells;

FIGS. 3(a) and 3(b) show, respectively, a representative X-ray diffraction pattern of $LaSn_3$ (Pm-3m; a=4.77 Å) typical of a $MM'_3$-type intermetallic structure, and a typical X-ray diffraction pattern of experimentally-prepared $LaSn_3$;

FIG. 4 depicts the X-ray diffraction pattern of a substituted $LaSn_{3-x}In_x$ electrode sample (x=0.3);

FIG. 5 depicts an electrochemical cycling plot of a $Li/LaSn_3$ cell;

FIG. 6 depicts a capacity vs. cycle number plot of a $Li/LaSn_3$ cell;

FIG. 7 depicts an electrochemical cycling plot of a $Li/LaSn_{3-x}In_x$ cell;

FIG. 8 depicts a capacity vs. cycle number plots of a $Li/LaSn_{3-x}In_x$ cell;

DETAILED DESCRIPTION OF THE PREFERRED EMBODIMENTS

Figure 9:
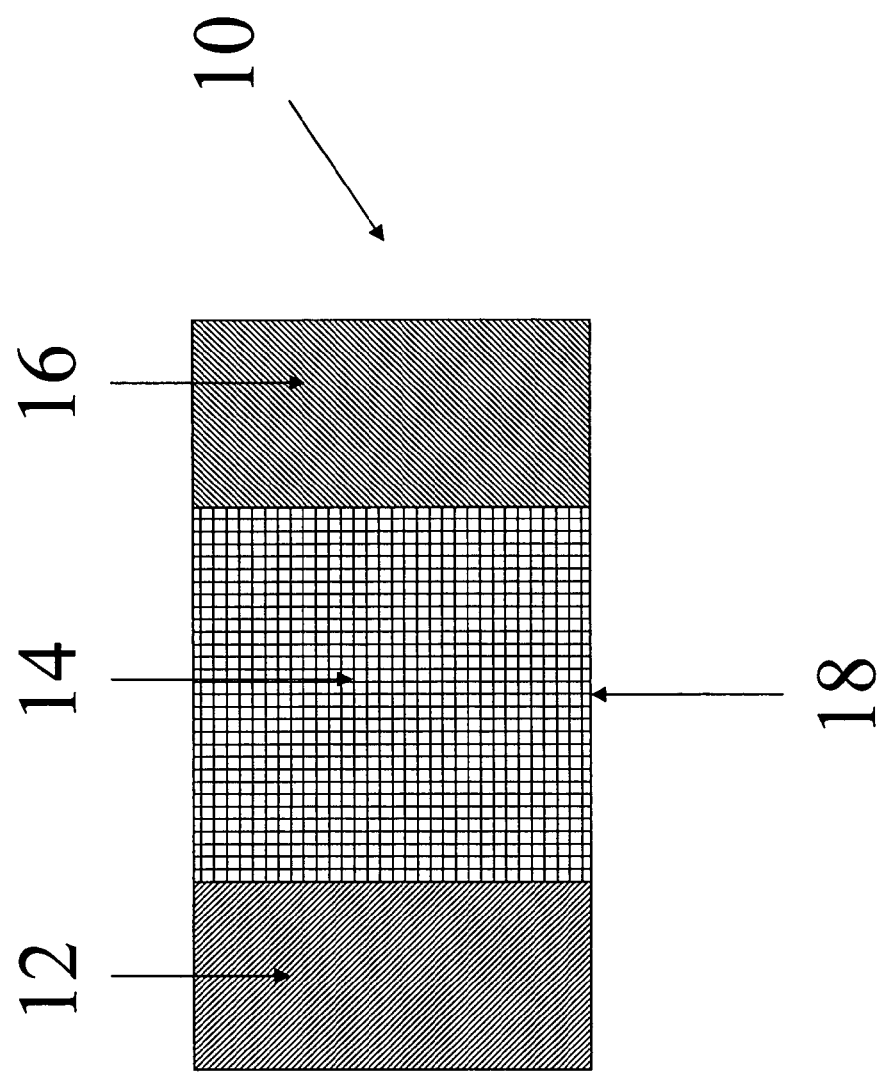
FIG. 9 depicts a schematic representation of an electrochemical cell.

This invention relates to negative electrode compounds for non-aqueous, electrochemical lithium cells and batteries. More specifically, the invention relates to one or more electrode components or compositions, one of which contains the basic structural unit of a $MM'_3$ intermetallic compound with a $LaSn_3$-type structure in which the M and M' atoms are comprised of one or more metals, for example, as characterized by the families of Sn-based compounds, $LaSn_3$, $PrSn_3$, $NdSn_3$ and In-based compounds $LaIn_3$, $PrIn_3$, $NdIn_3$ in which the M' are atoms (Sn, In) that alloy with lithium. The structures of $LaSn_3$-type structures typically have a crystallographic primitive unit cell. The invention extends to include ternary, quaternary and higher order intermetallic electrodes in which the M and M' metal atoms can be of more than one atom type, and in which either the M atom types and/or the M' atom types form binary alloys when reacted with lithium. For convenience and simplicity, the terms 'intermetallic compound' and 'metal alloy' are used synonymously and interchangeably to define the negative electrodes of this invention. Examples of metal elements that alloy with lithium include Mg, Al, Zn and Sb, whereas examples of non-alloying elements besides La, Pr and Nd are Ti, V, Cr, Mn, Fe, Co, Ni and Cu. The $MM'_3$ intermetallic electrode compounds can be mixed, blended or integrated with one or more other intermetallic compounds with the same or different crystallographic structures, such as isostructural $M_3M'$ compounds, for example $La_3Sn$ or $La_3In$, or those defined by face-centered unit cells, to provide the electrode with enhanced electrochemical, structural, cycling and safety properties. The M and M' atoms in the $MM'_3$ and $M_3M'$ electrode structures of the present invention can be either ordered or disordered. The electrodes are of particular use in rechargeable lithium-ion batteries for energy storage in widespread applications such as portable electronic devices (cell phones and laptop computers), medical devices, space, aeronautical and defense-related devices and in transportation applications such as electric and hybrid-electric vehicles.

In the MM'$_3$ electrode structures of the present invention, as typified, for example by the primitive cubic structures with Pm-3m symmetry depicted for LaSn$_3$, PrSn$_3$, NdSn$_3$ LaIn$_3$, PrIn$_3$ and NdIn$_3$ in FIG. 1a, the La, Pr and Nd (M) atoms reside at the corners of the unit cell, while the Sn or In (M') atoms reside at the face-centered positions. As such, each MM'$_3$ unit represents a pseudo face-centered cubic unit cell. Such a pseudo face-centered unit cell, in which the M and M' atoms together are located at the face-centered positions of a unit cell, has an interstitial space comprised of several, crystallographically distinguishable, vacant sites, one at the body-centered position of the unit cell, eight tetrahedrally-coordinated positions, each site being coordinated to one corner site (M) and three face-centered sites (M'), and twelve edge-shared positions, midway along each unit cell edge. The interstitial space of such a face-centered unit cell can accommodate guest atoms, such as lithium atoms. Such face-centered host lattices have already been shown to exist in lithiated zinc-blende structures, such as Li$_2$CuSn with a CuSn zinc-blende framework (Kepler et al, Electrochemical and Solid State Letters, Volume 2, page 307, 1999), and Li$_2$CuSb with a CuSb zinc-blende framework (Fransson et al, Electrochemistry Communications, Volume 3, page 317, 2001, as shown in FIG. 2a. In these lithiated zinc-blende structures, the Sn (Sb) atoms reside in all the face-centered positions of the unit cell; the lithium and copper atoms occupy all the interstitial sites described above for the pseudo face-centered cubic unit cell of the MM'$_3$ electrodes of this invention. Furthermore, it has been demonstrated by Fransson et al. (Journal of the Electrochemical Society, Volume 149, page A736, 2002) that additional lithium can be inserted into Li$_2$CuSn at the expense of Cu to yield a Li$_{2+x}$Cu$_{1-x}$Sn solid solution that ideally would yield a Li$_3$Sn structure at full lithium insertion/copper extrusion. This reaction is not fully reversible because it is difficult to reintroduce all the extruded copper back into the host structure when the direction of the electrochemical current is reversed.

This problem is overcome by the electrodes of the present invention, because the pseudo face-centered cubic unit cell provides an interstitial space for the unrestricted diffusion of lithium. Therefore, if the interstitial space of a pseudo face-centered cubic LaSn$_3$ unit cell is fully occupied by lithium, the composition of the lithiated compound is Li$_{12}$LaSn$_3$; at this electrode composition, the Li:Sn ratio is 4:1, which is close to the maximum lithium content reported for a binary Li$_x$Sn electrode (Li$_{4.4}$Sn).

If, however, all the La is extruded from the Sn host framework during the reaction of lithium with LaSn$_3$, then the composition Li$_{12}$LaSn$_3$ would be represented, alternatively, as "3Li$_4$Sn+La". This invention, therefore, reveals a new class of negative electrode materials for lithium-ion batteries that operate either by lithium insertion or by metal displacement reactions or a combination of both. The lithiated MM'$_3$ electrode of this invention can, therefore, have a structure comprised of lithium atoms within the interstitial spaces of the MM'$_3$ structure and/or it can have a lithiated MM'$_3$ structure in which the M and/or M' atoms are partially or completely displaced from the MM'$_3$ structure by lithium. Specific advantages over state-of-the-art graphite electrodes that the electrodes of the present invention offer include 1) greater safety, because graphite electrodes operate close to the potential of metallic lithium, whereas tin-based electrodes provide potentials close to 400 mV, 2) superior specific and gravimetric capacities, the values for C$_6$ (graphite) being 372 mAh/g and 818 mAh/ml, respectively, based on a density of 2.2 g/ml, whereas the corresponding values for LaSn$_3$ are 650 mAh/g and 4920 mAh/ml, respectively, based on a density of 7.57 g/ml and 3) greater structural stability to lithium insertion/extraction reactions.

In one embodiment, the MM'$_3$ electrode compounds of this invention are used either on their own or mixed, blended or structurally intergrown or integrated with one or more additional metals, metal alloys, intermetallic compounds, non-metal elements or compounds to improve a desired property or properties of the electrode. In a preferred embodiment, the MM'$_3$ compound is present at a concentration of not less than about 50 molar %. For example, a LaSn$_3$ electrode can be mixed, blended or intergrown with one or more lighter intermetallic Sn-containing compounds such as binary Cu$_6$Sn$_5$ and CoSn compounds, ternary Li$_2$CuSn or higher order systems to improve the theoretical and practical specific capacity of the electrodes.

In a second embodiment, the MM'$_3$ intermetallic compounds of this invention, any additional intermetallic compounds that are added to the electrodes, and their lithiated products have structures that are either ordered, disordered or partially disordered. For example, a MM'$_3$ compound such as LaSn$_3$ can contain other substituent atoms such as Pr or Nd in the M sublattice, such that a disordered arrangement of atoms exists. Furthermore, the additional compound can have the formula M$_3$M' with a La$_3$Sn-type structure in which the M and M' atoms are comprised of one or more metals. In this respect, M$_3$M' compounds such as La$_3$Sn$_3$, La$_3$In, Pr$_3$In, and Nd$_3$In compounds with Pm-3m symmetry that are isostructural with LaSn$_3$, LaIn$_3$, PrIn$_3$, and NdIn$_3$ are known to exist, thereby allowing for exchange between the M and M' atoms and for electrode compositions and structures intermediate between MM'$_3$ and M$_3$M'. By the same token, when the Sn atoms of LaSn$_3$, PrSn$_3$ and NdSn$_3$ are partially replaced by other atoms, such as In which, like Sn, forms binary compounds with lithium, the Sn$_{3-x}$In$_x$ sublattice is either ordered, disordered or partially disordered. Furthermore if, for example, a face-centered cubic intermetallic Li$_2$CuSn compound (i.e., M$_3$M' in which M=Li, Cu; M'=Sn) is blended with the MM'$_3$ intermetallic compound, then the M$_3$M' compound can be either ordered with a lithiated CuSn zinc-blende framework structure (FIG. 2a) or it can be disordered such that the Li and Cu are partially or randomly distributed (FIG. 2b) over the interstitial sites of the face-centered-cubic Sn array. Other ordered M$_3$M' configurations exist, for example, as reported for the Cu$_2$MnAl-type structure (FIG. 2c).

This invention therefore includes M$_3$M' compounds, in which M of the formula M$_3$M' is selected preferably from Li, Mn, Fe, Co, Ni, Cu, Zn, La, Pr, Nd, and combinations thereof and in which M' of the formula M$_3$M' is selected from In, Sn, Sb and combinations thereof, that are mixed, blended or intergrown with the MM'$_3$ intermetallic negative electrode compounds of the invention.

In a third embodiment of the invention, the MM'$_3$ and M$_3$M' intermetallic compounds of this invention can be either stoichiometric or non-stoichiometric such that vacancies or defects exist within their structures, or such that interstitial sites are partially occupied, as is well known for crystallographic structures, in general.

In a fourth embodiment, in order to enhance the performance of the MM'$_3$ electrode compounds in lithium cells, for example, electrochemical capacity and cycling stability, the M and/or M' atoms in the MM'$_3$ intermetallic electrode compounds may be partially substituted by other metal or non-metal atoms to the extent of about 50 atom % or less, preferably, about 20 atom % or less, and most preferably, about 10 atom % or less.

In order to achieve high capacities and high current rates, the primary electrode particles of the initial, parent electrodes should preferably be as small as possible, with nanodimensions less than 1000 nm, preferably less than 500 nm, and most preferably less than 200 nm. In this respect, intermetallic electrode powders can be fabricated with nanodimensions, for example, in sizes from ~200 nm to ~100 nm using an industrial NanoScission™ technology process from Primet Precision Materials located in Ithaca, N.Y. (www.primetprecision.com). Furthermore, it is well known in the art that good electronic conductivity between electrode particles should be maintained at all times during cell and battery operation, particularly because pure metals and intermetallic compounds tend to undergo large volume changes during electrochemical cycling that lead to pulverization of the electrode particles and loss of electronic contact between them. To this extent, the electrode should include an optimum amount of current collecting medium, such as carbon, for example acetylene black, metal powders, electronically conducting polymers, and the like. The small, electrochemically pulverized nanoparticles of the lithiated MM'$_3$ electrode compounds of this invention can be amorphous to X-ray radiation.

The following examples describe the broad principles of the invention as contemplated by the inventors, but they are not to be construed as limiting examples.

EXAMPLE 1

A LaSn$_3$ electrode is synthesized, first, by reacting metallic tin and metallic lanthanum in stoichiometric amounts at elevated temperature, for example 500° C., under argon for 12 hours. Thereafter, the sample is ground by mechanical milling to an average particle size of less than 10 microns. The X-ray diffraction pattern (CuK$_\alpha$ radiation) of a representative LaSn$_3$ product is shown in FIG. 3a. The X-ray diffraction pattern of a LaSn$_3$ sample made by reacting stoichiometric amounts of intimately mixed powders of La metal and Sn metal, first under argon at 500° C. for 2 days and, thereafter, after being reground at room temperature, at 500° C. for an additional 3 days is shown in FIG. 3b; the pattern shows that the product is predominantly LaSn$_3$, and contains a minor proportion of an unidentified impurity phase.

EXAMPLE 2

A substituted LaSn$_{3-x}$In$_x$ (x=0.3) electrode product was synthesized from stoichiometric amounts of La, Sn and In metal powders according to the procedure described in Example 1 (FIG. 3b). The powder X-ray diffraction pattern of the LaSn$_{2.7}$In$_{0.3}$ product is shown in FIG. 4 (also CuK$_\alpha$ radiation). The major peaks in the pattern are essentially coincident with those in the X-ray diffraction pattern of the LaSn$_3$ product in FIG. 3b. The refined a lattice parameter of the primitive cubic unit cell of the LaSn$_{2.7}$In$_{0.3}$ product (4.758 Å) was determined to be marginally greater than that of LaSn$_3$ (4.740 Å), providing strong evidence of solid solution behavior between LaSn$_3$ and LaIn$_3$; for comparison, the a lattice parameter of LaSn$_3$ in the Inorganic Crystal Structure Database (ICSD) is reported to be 4.770 Å.

EXAMPLE 3

Blended electrodes that contain two electrochemically active compounds, such as two Sn-based compounds, LaSn$_3$ and Cu$_6$Sn$_5$, can be prepared simply by blending the LaSn$_3$ product described in Example 1 (FIG. 3b) with a Cu$_6$Sn$_5$ product, which is prepared in similar fashion by ball milling tin and copper powders in a 1.2 to 1.0 ratio, as described more fully by Kepler et al. in Electrochemical and Solid State Letters, Volume 2, page 307 (1999). The X-ray diffraction patterns of blended electrodes, such as a representative LaSn$_3$/Cu$_6$Sn$_5$ product, are characteristic of two-phase systems. Moreover, the amounts of the two (or more) components or phases that constitute an electrode, such as LaSn$_3$ and Cu$_6$Sn$_5$, can be tailored to provide a blended electrode with optimum electrochemical properties.

EXAMPLE 4

Electrochemical test cells for evaluating electrodes and for demonstrating the principles of this invention were constructed in the following typical manner. Laminates of the electrodes were fabricated by mixing 84 wt % intermetallic material with 8 wt % carbon (acetylene black) to aid current collection and 8 wt % polyvinylidine difluoride binder (PVDF). The electrode slurry was extruded onto copper-foil and vacuum-dried at 120° C. for at least 5 h prior to use. Two-electrode cells are assembled in an argon filled glove-box (O$_2$ and H$_2$O<5 ppm) using the intermetallic electrode as the working electrode and lithium as the counter electrode, separated by a porous polyethylene oxide membrane soaked in electrolyte. A 1M LiPF$_6$ EC/DEC (2:1) solution was used as electrolyte. The operating cell potential, capacities delivered by the electrodes and cycling efficiencies are obtained by cycling the electrodes typically within the range 1.5-0.0 V vs. metallic lithium.

(I) The electrochemical charge/discharge cycling behavior for the first ten cycles of a Li/LaSn$_3$ cell containing the LaSn$_3$ electrode made according to the procedure described in Example 1 (FIG. 3b) is shown in FIG. 5. In this example, the cell was charged and discharged between 1.5 and 0 V at a current rate of approximately 1.8 mA/cm$^2$; the corresponding capacity vs. cycle number plot for this cell is shown in FIG. 6. Despite an irreversible capacity loss on the initial cycle, the LaSn$_3$ electrode delivers a rechargeable specific capacity of between 250 and 225 mAh/g, that corresponds to a volumetric capacity between 1892 and 1703 mAh/ml, respectively, for a LaSn$_3$ electrode density of 7.57 g/ml) for the first ten cycles, thereby demonstrating the intrinsic reversibility of the reaction. Moreover, the practical volumetric capacity of the LaSn$_3$ electrode is significantly superior to the theoretical volumetric capacity of state-of-the-art graphite electrodes (818 mAh//ml), which gives the LaSn3-type electrodes of this invention a significant advantage over conventional lithium-ion cells and batteries when the volume of the cells and batteries is an important factor. A capacity of 250 mAh/g represents a 38.5% utilization of the available LaSn$_3$ electrode capacity on the basis that the reaction of 4 lithium atoms per LaSn$_3$ unit represents the theoretical capacity of the electrode (650 mAh/g). The first-cycle irreversible capacity loss is a common feature of intermetallic electrodes; this irreversible capacity can be attributed, at least in part, to reduction reactions that occur with the electrolyte below 1 V vs. lithium during which a passivating and protective, solid-electrolye-interphase (SEI) layer is formed on the electrode particle surface.

(ii) The electrochemical cycling behavior of a Li/LaSn$_{3-x}$In$_x$ cell containing a substituted LaSn$_{3-x}$In$_x$ electrode (x=0.3), charged and discharged between 1.5 and 0 V at a current rate of approximately 0.7 mA/cm$^2$ for the first 8 cycles is shown in FIG. 7; the corresponding capacity vs. cycle number plot of this cell for the first ten cycles is provided in FIG. 8. Although the average gravimetric discharge capacity for the first ten cycles (~170 mAh/g) is slightly lower than that determined for the LaSn$_3$ electrode (~240 mAh/g, FIG. 6), these initial studies demonstrate that the voltage profiles and cycling stability of the lithium cells containing the parent LaSn$_3$ electrode and substituted LaSn$_{3-x}$In$_x$ electrode were similar; the average volumetric capacity of the LaSn$_{2.7}$In$_{0.3}$ electrode (1287 mAh/ml), like that of LaSn$_3$, is also significantly superior to the theoretical volumetric capacity of state-of-the-art graphite electrodes (818 mAh//ml).

Figure 10:
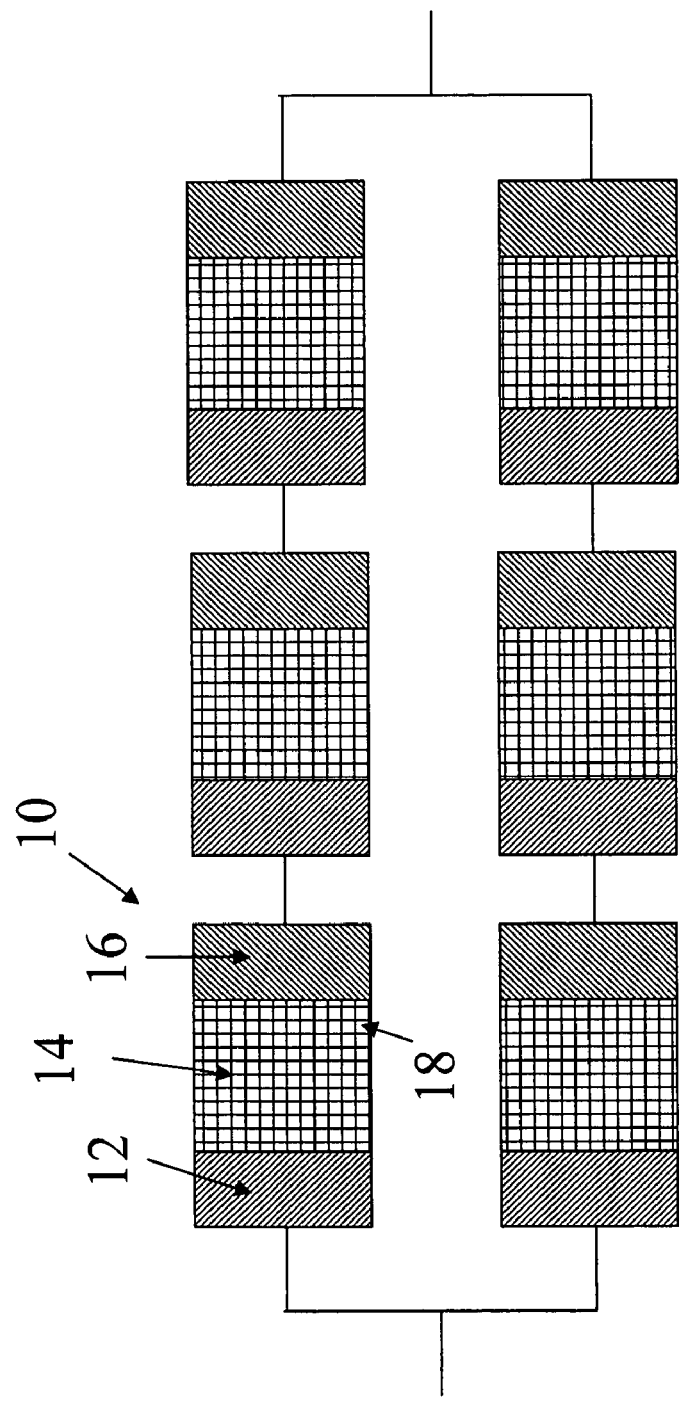
FIG. 10 depicts a schematic representation of an electrochemical battery consisting of a plurality of cells connected electrically in series and in parallel.

As seen schematically in FIG. 9, this invention relates, therefore, to an intermetallic negative electrode for a non-aqueous electrochemical lithium cell 10 having a negative electrode 12 separated from a positive electrode 16 by an electrolyte 14, all contained in an insulating housing 18 with suitable terminals (not shown) being provided in electronic contact with the negative electrode 12 and the positive electrode 16, and for batteries with a plurality of cells connected either in series and/or in parallel, as shown schematically in FIG. 10. Binders and other materials normally associated with both the electrolyte and the negative and positive electrodes are well known in the art and are not described herein, but are included as is understood by those of ordinary skill in this art.

Therefore, this invention includes an intermetallic negative electrode for non-aqueous electrochemical lithium cells and batteries, the negative electrode containing the basic structural unit of a MM'$_3$ intermetallic compound with a crystallographic primitive unit cell, for example, as characterized by the families of Sn-based compounds, LaSn$_3$, PrSn$_3$, NdSn$_3$ and In-based compounds LaIn$_3$, PrIn$_3$, NdIn$_3$ in which the M' are atoms that alloy with lithium, for example, Sn and In.

All papers or references cited are herein incorporated by reference.

While there has been disclosed what is considered to be preferred embodiments of the present invention, it is understood that various changes in the details may be made without departing from the spirit, or sacrificing any of the advantages of the present invention. It is also understood that additional improvements in the capacity, cycling stability and other physical, chemical and electrochemical properties of the electrodes can be expected to be made in the future by improving and optimizing the composition of the intermetallic materials of this invention and the processing techniques whereby the intermetallic materials are made.

The embodiments of the invention in which an exclusive property or privilege is claimed are defined as follows:

1. A negative electrode compound for a non-aqueous, electrochemical lithium cell comprising an intermetallic compound having formula MM'$_3$ at a concentration of not less than about 50 molar %, mixed, blended or intergrown with La$_3$In, wherein M is selected from Li, Mn, Fe, Co, Ni, Cu, Zn, La, Pr, Nd, and combinations thereof, and the M' is selected from In, Sn, Sb and combinations thereof.

2. The electrode compound of claim 1, wherein a structure of MM'$_3$ has a crystallographic primitive unit cell.

3. The electrode compound of claim 2, wherein the M and M' atoms are disordered in the structure.

4. The electrode compound of claim 1, wherein the MM'$_3$ formula is non-stoichiometric.

5. The electrode compound of claim 1, wherein the M and/or M' atoms are partially substituted by other metal or non-metal atoms to the extent of about 50 atom % or less.

6. The electrode compound of claim 1, wherein either the M atoms and/or M' atoms form binary alloys when reacted with lithium.

7. The electrode compound of claim 1, wherein MM'$_3$ is selected from one or more of the following compounds, LaSn$_3$, PrSn$_3$, NdSn$_3$, LaIn$_3$, PrIn$_3$, and NdIn$_3$.

8. The electrode compound of claim 7, wherein MM'$_3$ is selected from LaSn$_3$ and LaIn$_3$.

9. The electrode compound of claim 8, wherein MM'$_3$ is LaSn$_3$.

10. The electrode compound of claim 1, and further comprising lithium atoms within interstitial spaces of an MM'$_3$ structure.

11. The electrode compound of claim 10, wherein the M and/or M' atoms are partially or completely displaced by lithium.

12. A non-aqueous lithium electrochemical cell comprising a negative electrode, an electrolyte and a positive electrode, the negative electrode comprising the negative electrode compound of claim 1.

13. A non-aqueous lithium battery comprising a plurality of electrically connected electrochemical cells of claim 12.

* * * * *

UNITED STATES PATENT AND TRADEMARK OFFICE
CERTIFICATE OF CORRECTION

| | | |
|---|---|---|
| PATENT NO. | : 8,124,280 B2 | Page 1 of 1 |
| APPLICATION NO. | : 12/002968 | |
| DATED | : February 28, 2012 | |
| INVENTOR(S) | : Michael M. Thackeray et al. | |

It is certified that error appears in the above-identified patent and that said Letters Patent is hereby corrected as shown below:

IN THE CLAIMS:

Column 8, line 7, after the word "having", insert the word --the--;

line 12, after the word "wherein", delete "a" and insert the word --the--;

line 32, after the word "within", insert the word --the--.

Signed and Sealed this
Twenty-ninth Day of May, 2012

David J. Kappos
*Director of the United States Patent and Trademark Office*